Patented Jan. 15, 1952

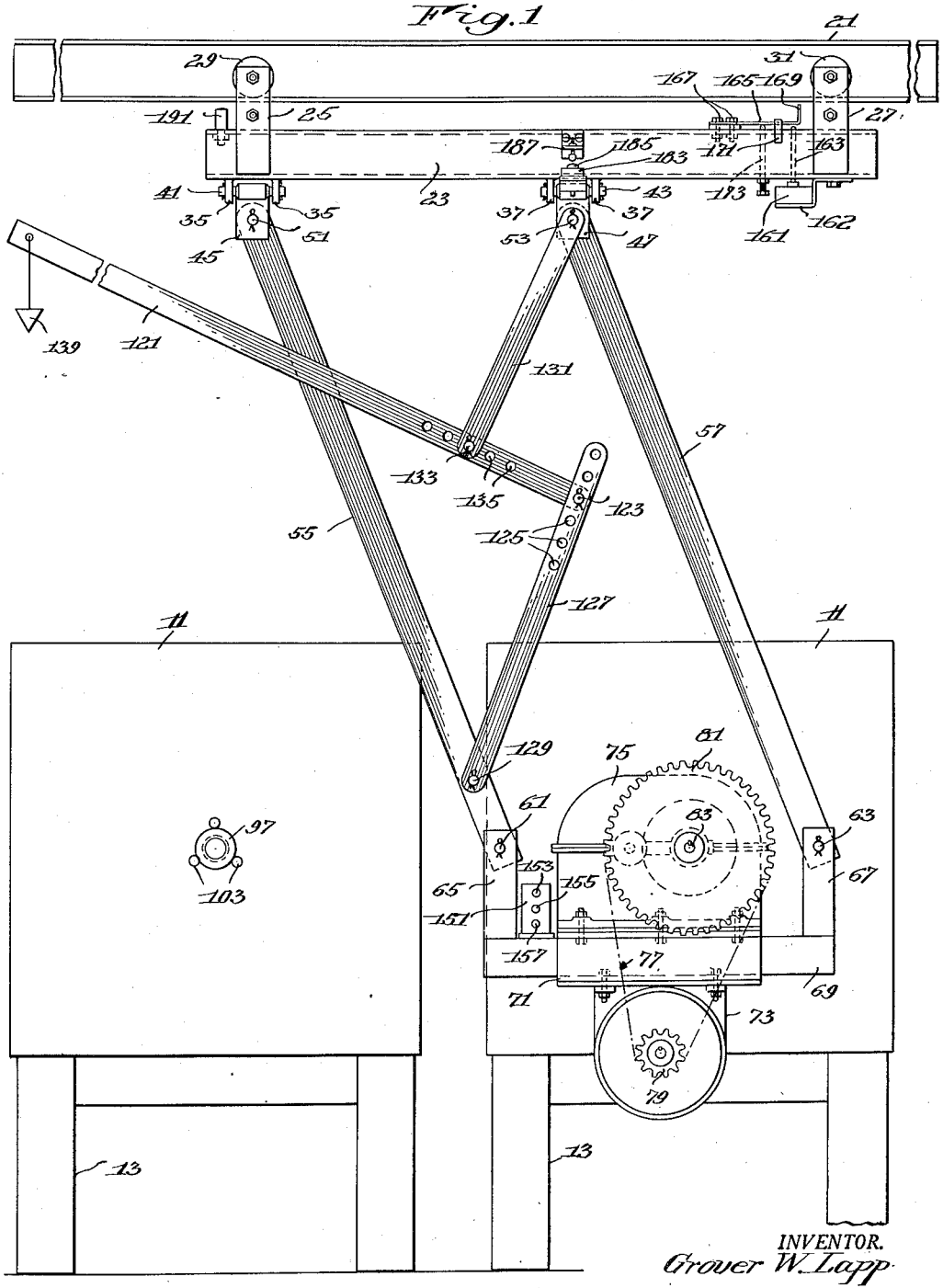

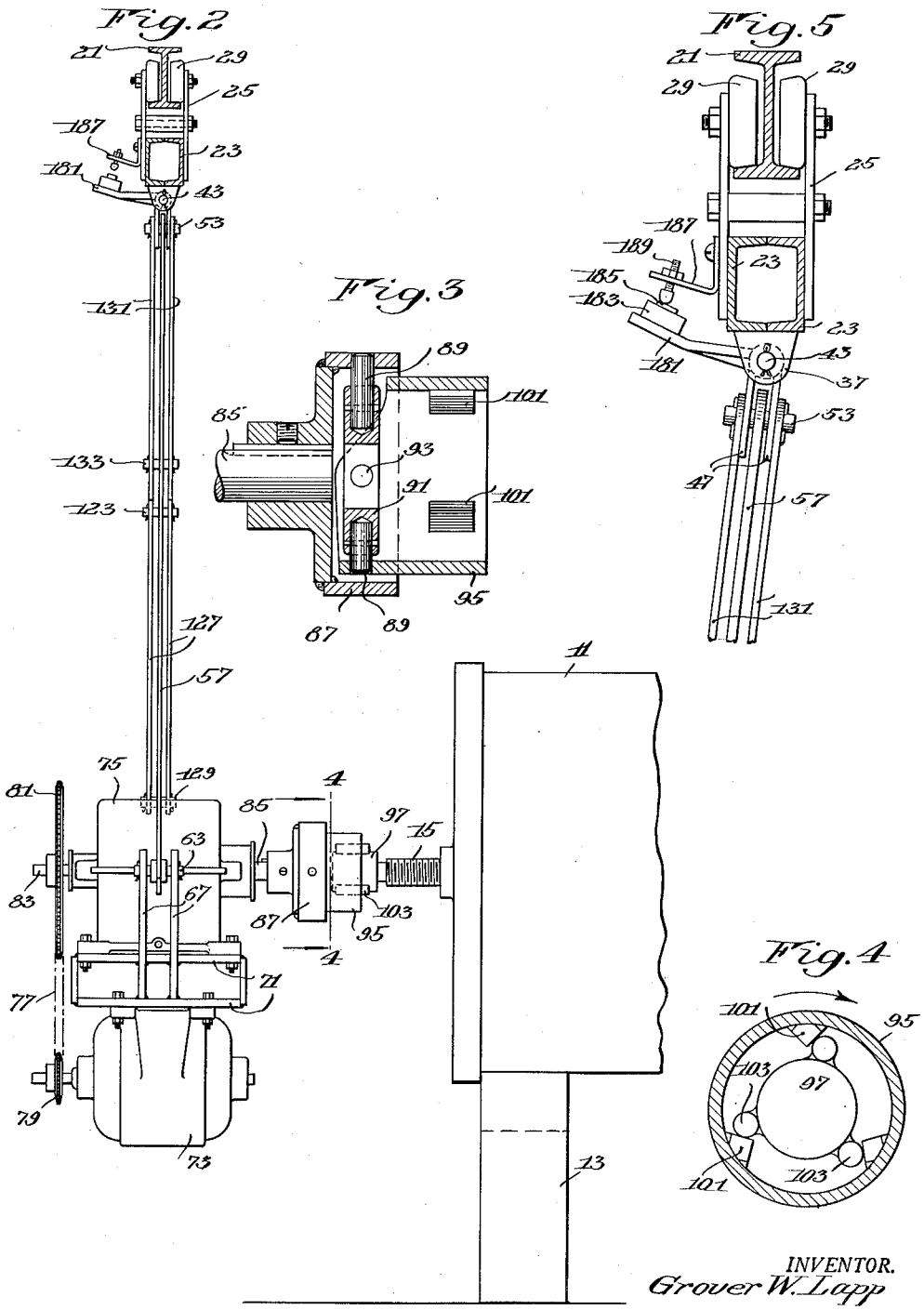

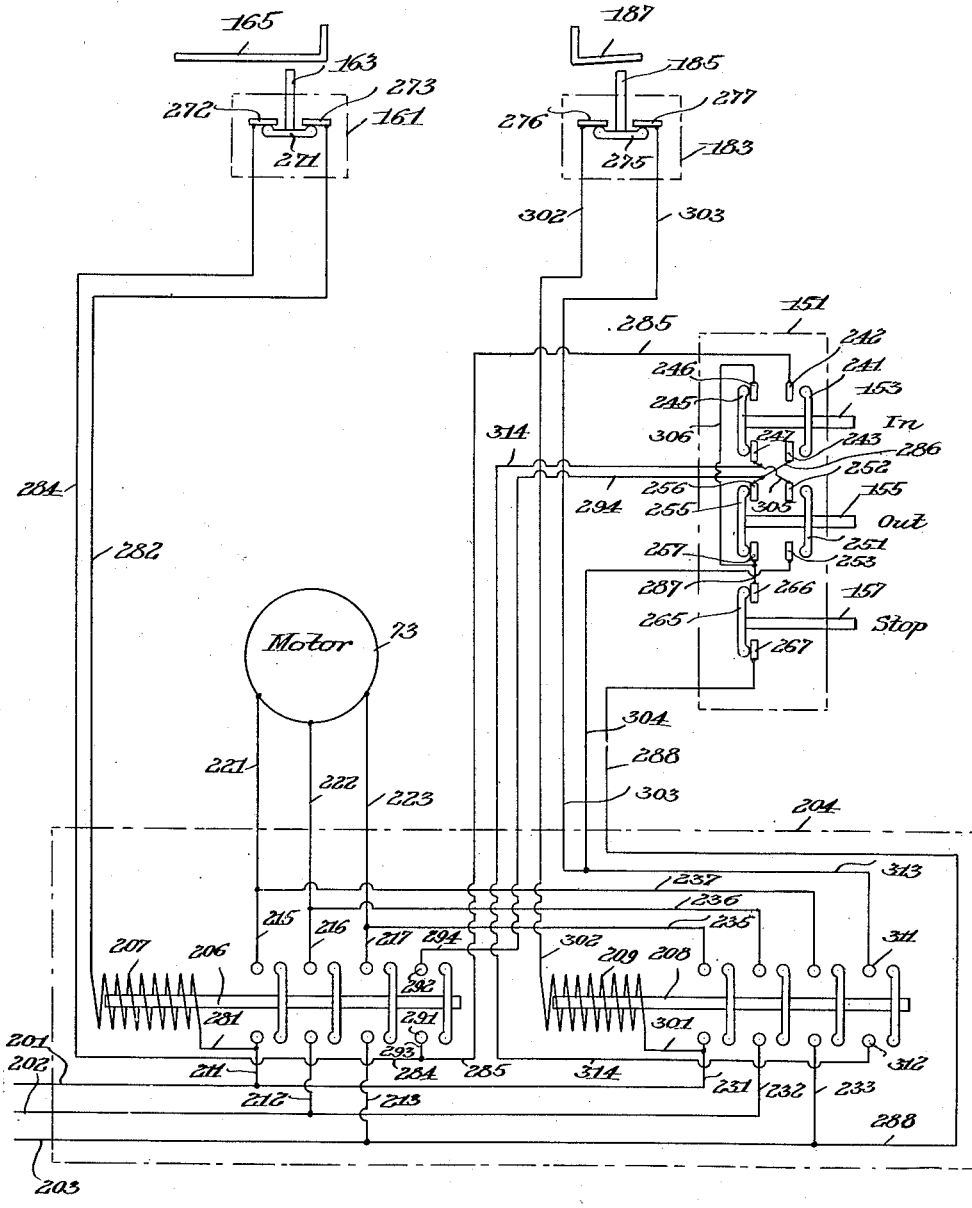

2,582,442

UNITED STATES PATENT OFFICE 2,582,442

POWER WRENCH MECHANISM FOR CERAMIC FILTER PRESSES

Grover W. Lapp, Le Roy, N. Y., assignor to Lapp Insulator Company, Inc., Le Roy, N. Y., a corporation of New York Application May 19, 1945, Serial No. 594,669

15 Claims. (Cl. 81—54)

In various branches of the ceramic industry, use is made of so-called filter presses, in which the tightening of a screw causes pressure between the leaves of the filter press, preventing liquid from leaking out of the cells under pumping pressure. In many establishments a considerable number of such filter presses are used, and it is quite an arduous and time-consuming task to tighten the screws of the filter presses, then release the screws when the pressing operation is completed, and again tighten them for a new pressing operation, this being heretofore accomplished usually by hand. It is, accordingly, an object of the present invention to provide a mobile motorized unit which may be moved about from one filter press to another, whereby the filter press screws may be tightened or loosened by means of power, such as an electric motor, rather than by hand.

Another object is the provision of compact, simple, and efficient apparatus whereby the screws of filter presses may be quickly and easily tightened or loosened, as required.

Still another object is the provision of such apparatus so designed and constructed that it may be applied easily to existing batteries of filter presses as well as to new installations thereof, without requiring any substantial alteration or reconstruction of such existing filter presses.

A further object is the provision of apparatus of the kind above described, so designed that it may be easily and rapidly connected to or disconnected from a filter press, and moved from one filter press to another.

A still further object is the provision of such apparatus having means for automatically turning off the motive power when the filter press screw has been tightened or loosened to a predetermined extent.

These and other desirable objects are accomplished by the construction disclosed as an illustrative embodiment of the invention in the following description and in the accompanying drawings forming a part hereof, in which:

Fig. 1 is a front elevation of two filter presses, with a preferred form of apparatus according to the present invention applied to and operating upon one of them;

Fig. 2 is a side elevation of the apparatus and a fragment of the filter press;

Fig. 3 is a section taken axially through the coupling member of the apparatus, which detachably couples the same to the filter press, the upper half of this view being taken in one plane and the lower half in a plane at right angles thereto;

Fig. 4 is a vertical section taken tarnsversely through the coupling member, substantially on the line 4—4 of Fig. 2;

Fig. 5 is an enlarged view similar to the upper portion of Fig. 2, illustrating the actuation of the automatic stopping switch during a press loosening operation; and Fig. 6 is a wiring diagram illustrating the manner in which the various control switches are wired to the motor.

The same reference numerals throughout the several views indicate the same parts.

Referring now especially to Figs. 1 and 2 of the drawings, there is shown diagrammatically a portion of a filter press 11 of any standard or conventional construction, supported at a convenient elevation by legs 13, and having at its front end an operating screw 15 which extends horizontally out of the end of the press and which, when rotated in a righthand or clockwise direction when viewed from the front, has the effect of tightening the press in known manner, and which may be rotated in a leftward or counterclockwise direction to loosen the press. In many establishments several such filter presses are used in a battery or series, in side by side relationship, two such presses being shown by way of example in Fig. 1.

Heretofore it has been the usual practice to tighten and loosen the screw 15 of each press by hand, by means of a wrench attached to the screw. This has not only required considerable labor, but has been slow and tedious. According to the present invention, the tightening or loosening is performed quickly and with minimum effort and labor, by means of a mobile motorized wrench unit hung from and traveling along an overhead track such as the I-beam 21 suitably supported from the ceiling or other framework in the establishment, and running approximately parallel to the front ends of the battery or series of filter presses, offset somewhat forwardly from such front ends as indicated in Fig. 2. On this track runs a suitable carriage made for example from a pair of channel beams 23 welded to each other face to face as indicated in Figs. 2 and 5, and supported by brackets 25 and 27 carrying pairs of wheels 29 and 31 running on the lower flanges of the track 21.

Welded or otherwise suitably secured to the lower face of the carriage members 23 are two pairs of depending lugs or ears, one pair being indicated at 35 and the other at 37. In these pairs of ears are mounted longitudinally extending pivots 41 and 43 respectively, from which pivots hang pairs of laterally spaced ears 45 and 47 respectively, in which ears are carried transverse pivot pins 51 and 53 respectively. These pivot pins support the upper ends of linkage bars 55 and 57 respectively, pivoted at their lower ends by pivots 61 and 63 respectively to upstanding members 65 and 67 fixed to the left and right ends of frame members 69 carrying suitable bed plates 71 from which is hung an electric motor 73 and on which is supported a reduction gear box 75 of any suitable known construction. A chain 77 running over a sprocket 79 on the motor drives a sprocket 81 on the high speed shaft 83 of the gear reduction box. The low speed shaft of this gear reduction box is indicated at 85 (Fig. 2) and one the end thereof is mounted a universal joint coupling comprising a cup-shaped member 87 driving a pair of diametrically arranged pins 89 mounted on a ring 91, other pins 93 of which at right angles to the pins 89 drive a cylindrical member 95. This coupling member 95 is arranged to extend loosely over the enlarged end or head 97 of the screw 15, and it has a plurality of lugs 101 projecting inwardly from the inner face of the member 95, for floating engagement with a plurality of lugs 103 welded to and projecting outwardly from the circumference of the head 97 of the filter press screw, so that there is a somewhat floating driving connection as indicated at Fig. 4, but with plenty of play and freedom so as not to require any particularly accurate alinement in engaging the parts initially.

It is seen from Fig. 1 that the links 55 and 57 are substantially parallel to each other and that these links, together with the carriage 23 and the members 65, 67, and 69, constitute in effect a parallelogram linkage which can be swung to various positions in the plane of the parallelogram. As the linkage swings, the elevation of the motor 73 and gear box 75 will be changed. If the links 55 and 57 are swung to a more nearly vertical position, the motor and gear box will be somewhat lowered. If they swing to a more inclined position, the motor and gear box are raised. This ability of the parts to swing and thus to raise or lower to some extent permits the coupling member 95 to be brought to the proper elevation to engage the screw head of the filter press, notwithstanding the fact that in the series or battery of filter presses, the screws of some of them may be a little higher or little lower than others.

The weight of the motor and gear box would tend, of course, to move these parts to their lowest position, in which the links 55 and 57 would hang down vertically. To tend to maintain the motor and gear box in a slightly elevated position relative to its lowest position, and also to assist in easy raising or lowering as required, there is provided a further linkage or lever system, as best shown in Fig. 1, comprising the main lever 121 pivoted at 123 in any one of a series of holes 125 in a pair of spaced links 127 pivoted at 129 to the link 55 near its lower end. Another pair of spaced links 131 are pivoted at their upper ends on the pivot 53 from which the link 57 is hung, and are pivoted at their lower ends by the pivot 133 to any one of a series of holes 135 in the lever 121. If the left end of the lever 121 is depressed, this will pull upwardly on the link 127, thus swinging the lower ends of the links 55 and 57 rightwardly and upwardly and raising the motor 73 and the gear box 75 and coupling member 95. If the left end of the lever 121 be pushed upwardly, the reverse action will occur, the lower ends of the links 55 and 57 will be swing downwardly and leftwardly, and the elevation of the motor and gear box will be lowered. To keep the parts in an approximate state of equilibrium, there may be connected into the linkage an adjustable spring, or preferably a weight such as indicated diagrammatically at 139 may be hung from the left end of the lever 121. If it is desired to maintain the motor and coupling member at a somewhat higher elevation, either the weight 139 may be increased, or the pivot 133 may be moved to another one of the holes 135 closer to the pivot 123. If it is desired to maintain the motor and coupling member at a lower elevation, the weight 139 may be decreased, or the pivot 133 may be moved to one of the holes 135 farther from the pivot 123.

From the description given thus far, it is readily understood that this motorized wrench unit may be readily pushed by slight effort along the track 21 until it is located opposite the particular filter press which is to be tightened or loosened. Then, by pulling down or pushing up on the lever 121 or by applying upward or downward pressure directly to the motor support, to raise or lower the motor, the shaft 85 and coupling member 95 may be brought directly opposite the end of the screw 15 of the filter press, and the coupling member 95 may be thrust over the head of the screw, the fit of the parts being a loose one easy to engage or disengage. Due to the presence of the lever 121 and the counterweight 139 (or the counterbalance spring, if used in place of the counterweight) the parts are so nearly in a state of perfect balance and equilibrium, so far as upward and downward movements are concerned, that only very slight force is required to raise or lower the parts to such extent as is necessary to couple onto any given filter press. During the engagement or disengagement of the coupling member 95 and the head of the filter press screw, the motorized assembly can readily swing toward or away from the screw head as required, due to the presence of the pivots 41 and 43 which permit such swinging, and also due in part to the general looseness of the various pivot joints which add further flexibility.

When the coupling member 95 has been engaged over the head of the screw, the motor 73 is started in one direction or the other, and the coupling member will turn, the lugs 101 thereof abutting against and driving the lugs 103 on the screw head 97, and thus rotating the filter press screw 15 in one direction or the other, as may be required to tighten or loosen it. Due to the inclination of the lugs 101, as best seen in Fig. 4, the coupling member will automatically center itself on the screw head 97 as soon as power is applied, and the whole motor wrench unit will automatically assume its proper position alined with the filter press screw 15. When the operation of tightening or loosening this filter press screw has been completed, the motor is stopped, the motor unit is swung outwardly away from the filter press screw to disengage the coupling member 95 from the screw head, and the apparatus is moved along the track 21 to bring it opposite the next filter press requiring either tightening or loosening, where the operation is repeated. All of this may be done with extreme ease and rapidity and without requiring any strenuous physical effort. The elevation of the pivots 41 and 43 is sufficiently high above the filter press screw so that the motor unit may be swung the required distance toward or away from the filter press, to connect or disconnect the parts, without any great effort. As the screw is tightened and works its way into the head of the filter press, the motorized unit follows the motion of the screw, automatically, and when the screw is being loosened the motorized unit likewise automatically swings outwardly away from the filter press as the screw projects farther and farther from the press.

A very satisfactory and efficient apparatus is provided if the motor is manually controlled, an attendant starting and stopping it as required. However, an even more efficient and satisfactory apparatus results if certain automatic controls are provided, and the preferred embodiment of the present invention includes such controls. It is desired, in addition to the manually operated switches for starting the motor in one direction or the other, and for stopping it, to provide for automatically stopping the motor when the torque on the filter press screw 15 reaches a certain predetermined amount during a tightening operation, and also for automatically stopping the motor when the screw has been unscrewed to a predetermined extent during a loosening operation. These automatic controls prevent accidental injury to the filter press in case the attendant, through inattention, fails to turn off the motor at the proper time.

Referring now to Fig. 1 of the drawings, there is indicated at 151 a manual control switch box having three buttons. The top of these, 153, may be the "in" button for starting the motor in a direction to tighten the filter press screw or to screw into the press. The second button 155 may be the "out" button for starting the motor in a reverse direction to screw the filter press screw outwardly so as to loosen the filter press. The bottom button 157 may be the "stop" button for stopping the motor.

In addition to this manual control box 15, there may also be a torque limit switch box 161 mounted on a bracket 162 on the carriage 23 and having a button or plunger 163 extending upwardly and underlying the end of a leaf spring 165, one end of which is bolted at 167 on a block or bracket on top of the carriage 23. The other end of the leaf spring is turned upwardly at 169 to terminate in a position just below the bottom of the track 21. A stirrup member 171 fixed to the carriage 23 extends over the top of the leaf spring 165 and limits its upward motion, while an adjusting screw 173 presses against the bottom of the spring between the stirrup 171 and the bolts 167, to vary the initial tension of the spring and thus to vary the force required to press the free end of the spring downwardly far enough to contact with and operate the plunger or button 163 of the switch box 161. When this plunger or button is depressed, it automatically stops the motor 73.

If it is assumed that the filter press screw is a righthand screw, it is seen that the tightening operation requires rotation of the shaft 85 of the motor unit in a clockwise direction when viewed from the front as in Fig. 1. The force applied by the motor 73 to produce the clockwise torque on the shaft 85 and coupling member 95 results, of course, in a reaction torque of equal magnitude and opposite or counterclockwise direction, on the parts which support the motor, namely, the members 65, 67, and 69. This counterclockwise torque results in a downward pull on the link 55 and an upward push on the link 57. When the upward push of the reaction torque on the link 57 becomes sufficiently great to overcome the downward pull of gravity due to the weight of the motor, gear box, and associated parts, there will be a tendency for the link 57 to push upwardly on the carriage 23. If this upward pushing is of sufficient magnitude (as is the case near the end of the tightening operation on the filter press screw) then the righthand end of the carriage 23 will be pushed upwardly with sufficient force so that the rollers 31 actually rise up from the track. This will bring the upstanding end 169 of the leaf spring 165 up against the bottom of the track 21, and will tend to depress the righthand end of the leaf spring, so as to contact with and actuate the switch plunger 163. By proper adjustment of the adjusting screw 173, the plunger 163 can be made to trip as a result of just the proper amount of upward pushing on the carriage 23, corresponding to the proper degree of tightening of the filter press screw 15, so that the motor 73 will be automatically stopped when the filter press screw has been tightened to the desired degree of torque.

A different form of limit switch is provided for stopping the motor at the end of a loosening operation. For this purpose, advantage is taken of the fact that as the filter press screw is loosened, it projects farther and farther from the press and causes the motor unit to swing appreciably away from its vertical position (when viewed edgewise as in Fig. 2) until the linkage members are in an inclined plane at an appreciable angle to the vertical plane passing through the track 21. As best seen in Figs. 2 and 5, the ears 47 carry a bracket 181 extending forwardly in a direction away from the filter press, which bracket carries a switch box 183 having a button or plunger 185 effective, when depressed, to stop the motor. Directly over the bracket 181 is a bracket 187 secured to the carriage 23 and carrying an adjusting screw 189 having a lower end positioned over the stop button 185 of the switch 183. As the filter press screw 15 is loosened, and gradually unscrews, it forces the motor unit leftwardly when viewed as in Fig. 2, swinging the linkage outwardly from the approximately vertical position shown in Fig. 2 to the substantially inclined position shown in Fig. 5. This inclination carries the bracket 181 upwardly until the stop button or plunger 185 meets the adjusting screw 189 and actuates the button to stop the motor. By proper adjustment of the screw 189, the degree of inclination at which the motor will be stopped can be controlled so as to cause the automatic stopping of the motor just at the proper time when the filter press screw 15 reaches substantially the limit of its travel in the unscrewing direction.

When the loosening operation first begins on a previously tightened filter press screw, a substantial torque is necessary to turn the screw. This torque, being in the unscrewing or counterclockwise direction, produces a counter torque on the motor supporting member 69 in a clockwise direction, tending to pull down on the link 57 and to push upwardly on the link 55. To prevent the wheels 29 at the left end of the carriage 23 from being raised to any appreciable extent from the track by this counter torque force, the left end of the carriage 23 is provided with a block or pin 191 (Fig. 1) having its upper surface fairly close to the bottom edge of the track, thus limiting possible upward movement of the left end of the carriage.

The manner in which the manual buttons 153, 155, and 157 in the manual switch box 151, and the limit switches 161 and 183, are wired to each other and to the motor to control the operations of the motor, is best seen in Fig. 6. Assuming that the motor is a three phase motor, current is supplied through the three main conductors 201, 202, and 203 as usual in three phase operation. The current may be led to the motor unit through a flexible cord which may be plugged into various outlets placed at intervals along the bank of filter presses. The outline 204 indicates diagramatically a magnetic reversing switch of known type available on the market, having a forward switch contact member 206 with four contacts normally held open by a spring and all closed simultaneously by means of the force exerted by a solenoid 207 when current flows through the solenoid. As soon as current ceases flowing through the solenoid, the switch immediately opens again. A similar reverse switch 208 likewise has the contacts normally open, and closed by flow of current through the solenoid 209, remaining closed only so long as the current continues to flow.

When the motor 73 is to run in a forward direction, for tightening the filter press screw or moving it "in," current is caused to flow as hereafter described through the solenoid 207, which closes the contacts of the switch 206. Thus current from the main supply wires 201, 202, and 203 may flow through the branches 211, 212, and 213, through the closed switch 206, to the wires 215, 216, and 217, respectively, and thence through the wires 221, 222, and 223 to the motor 73. If the motor is to run in the reverse direction, however, to loosen the filter press screw or move it "out," then current is caused to flow (as hereafter described) through the solenoid 209, which closes the switch 208 and all its contacts, so that current from the main supply wires 201, 202, and 203 may flow through the branches 231, 232, and 233, and through the closed switch 208, to the wires 235, 236, and 237, respectively, and thence to the wires 223, 222, and 221, respectively, causing the motor to run in the reverse direction.

The starting button 153 for causing the motor to run in the "in" or tightening direction, carries two contact bars, a normally open contact bar 241 associated with contacts 242 and 243, and a normally closed contact bar 245 associated with contacts 246 and 247. A spring, not shown, normally holds the contacts in this position, but if the button or plunger 153 is pushed inwardly, this closes the circuit through the contacts 242 and 243, and simultaneously opens the circuit of the member 246 and 247.

The push buton or plunger 155 for causing operation of the motor in the "out" or loosening direction, likewise has a normally open contact bar and a normally closed contact bar like those of the button 153. The normally open contact bar 251 cooperates with contacts 252 and 253, while the normally closed contact bar 255 cooperates with contacts 256 and 257. When this button 155 is pushed inwardly against the force of a spring (not shown) the contacts 256 and 257 are opened and simultaneously the contacts 252 and 253 are closed.

The manual stop button 157 requires no normally open contact bar, but only one contact bar 265, which is normally held closed by a spring and which cooperates with contacts 266 and 267.

The two limit switches are of a construction substantially the same as the stop switch 157. The torque limit switch plunger 163 for stopping the tightening operation carries a normally closed contact bar 271 cooperating with contacts 272 and 273. The swing-out limit switch plunger 185 has one normally closed contact bar 275 cooperating with contacts 276 and 277.

Let it be assumed now that all of the switches are in their normal positions shown in Fig. 6, and that it is desired to start the motor to perform a tightening operation on the filter press screw. The attendant pushes the "in" button 153 momentarily. This momentarily opens the contact 245, and closes the switch circuit through the parts 241, 242, and 243. Consequently, current may now flow to energize the solenoid 207 as follows: From the main supply wire 201 and the branch 211, through the wire 281 to the solenoid 207, thence through the wire 282 to the contact 273 of the torque limit switch, and through the normally closed contacts of this switch to the wire 284 and wire 285 to the contact 242, which has now been momentarily connected to the contact 243 by means of the contact bar 241. From the contact 243 current flows through the wire 286 to the normally closed contact 256 of the "out" switch, thence to the contact 257 thereof, thence through the wire 287 to the normally closed contact 266 of the "stop" switch, and from the contact 267 thereof through the wire 288 to the main line wire 203.

The moment current begins to flow through the circuit just described, the solenoid 207 is energized, pulling the switch 206 leftwardly and closing all the contacts associated with this switch. Current then flows through the closed contacts from the branches 211, 212, and 213 to the wires 215, 216, and 217, respectively, causing the motor to run in the "in" or tightening direction. If the attendant now releases the pressure on the switch plunger 153, this does not stop the motor but the motor will continue to run because the closing of the switch 206 has now closed the contacts 291 and 292 which are wired in parallel or multiple with the contacts 242 and 243 of the "in" switch 153. In other words, even though the attendant now releases the pressure on the plunger 153, current can still continue to flow through the solenoid 207 to keep this solenoid energized. The current flows as before through the wire 282, limit switch 163, and wire 284. But now, instead of flowing through the wire 285 to the contact 242, it flows through the wire 293 to the contact 291, thence to the contact 292 and through the wire 294 to the wire 286, thence to the contact 256 and, as before, through the contact 257, wire 287, contacts 266 and 267, and wire 288, to the line wire 203.

It is noted that regardless of whether the switch plunger 153 is depressed to close the contact members 241, 242, and 243, or whether the circuit is closed through the contacts 291 and 292, in either event current for keeping the solenoid 207 energized must flow through the normally closed limit switch 163 and through the normally closed stop switch 157. If either of these two switches just mentioned is opened, current instantly stops flowing through the solenoid 207 and the switch 206 automatically opens, stopping the motor. Therefore, the motor can be stopped at any time by manually pressing the stop button 157. If not stopped by this means, then when the tightening torque reaches the predetermined magnitude for which the spring 165 is set, the reaction force lifting the righthand end of the carriage 23 as previously described will act on the plunger 163 to open this switch and stop the motor. The motor cannot again be started in the same direction until pressure of the spring 165 is released so that the switch 163 closes, but the motor can be started in the opposite direction, through the circuits now to be described.

To start the motor in the "out" or loosening direction, the attendant presses the switch button 155, thus momentarily closing the normally open contacts 252 and 253, and opening the normally closed contacts 256 and 257. If perchance the motor was running in the "in" direction at the time the "out" switch was pressed, the opening of the contacts 256 and 257 would automatically stop the motor preparatory to its being started in the reverse direction, since it will be recalled from the above description that the contacts 256 and 257 are in the circuit of the solenoid 207.

Upon the momentary closing of the contacts 252 and 253, current will flow to energize the solenoid 209 to close the switch 208, as follows: From the line wire 201 through the branch 231 to the branch 301; thence through the solenoid 209 and wire 302 to the normally closed contacts 276 and 277 of the limit switch 185; thence through the wires 303 and 304 to the contact 253; thence to the contact 252 which is at this moment connected to the contact 253 because of the momentary pressure on the button 155; thence by the wire 305 to the normally closed contacts 247 and 246; thence by the wire 306 to the wire 287, and through the normally closed contacts 266 and 267 of the manual stop switch, to the wire 288 and the line wire 203. The current thus flowing for a moment through the circuit just described will energize the solenoid, closing all of the contacts associated with the switch 208, and permit current to flow from the line wires 201, 292, and 203, through the branches 231, 232, and 233 respectively, thence through the closed contacts of the switch 208, to the branches 235, 236, and 237 respectively, thus reaching the motor supply leads 223, 222, and 221 respectively to cause the motor to run in the reverse direction. At the same time that the switch 208 closes the motor circuit, it also closes the contacts 311 and 312 which are wired in parallel or multiple with the contacts 252 and 253 of the starting switch 155. Thus, even though the attendant now releases the pressure on the starting button 155, the motor will continue to run because the solenoid 209 will continue to be energized by current flowing through it. This flow will be, in the manner previously described, through the solenoid 209 and through the closed contacts of the limit switch 185, and the wire 303, to the wire 313, leading to the contact 311; thence from this contact to the contact 312 and to the wire 314; thence to the wire 305; and thereafter through the same wiring previously described, namely contacts 247 and 246, wires 306 and 287, contacts 266 and 267, to the line wire 203.

During this reverse operation of the motor, the filter press screw 15 is being unscrewed and the head thereof gradually travels outwardly away from the end of the filter press, thus swinging the motor unit until the bracket 181 brings the limit switch button 185 into contact with the adjusting screw 189 on the bracket 187, opening the normally closed contacts 276 and 277 of the limit switch 185 so as to break the circuit and stop the flow of current through the solenoid 209. As soon as this current stops flowing, the switch 208 automatically opens and the motor stops. It cannot be again started in the same direction until the pressure on the switch button 185 has been relieved, but it can be started in the opposite direction by pressing the switch button 153 as above described.

The motor can be stopped at any time, regardless of the direction in which it is running, by pressing the manual stop button 157, to open the contacts 266 and 267, for it will be observed from the foregoing description that these contacts 266 and 267 are in series in the circuit for energization either the solenoid 207 and 209, and current cannot flow through either solenoid unless the contacts 266 and 267 are closed.

The detailed construction of the reversing switch 204 itself, and of the switches in the switch boxes 151, 161, and 163, may be of conventional or standard design, and need not be further described. By wiring up these various standard switches in the manner herein disclosed, it is seen that a particularly efficient and satisfactory mechanism results, whereby the attendant may apply the motor wrench unit to the filter press screw and may start the motor in one direction or the other for tightening or loosening the screw as may be required, and then may walk away from the vicinity of the motor unit to attend to other duties elsewhere during the few minutes required for the screwing operation, without danger of damage of the apparatus because of his absence. If he does not return in time to stop the motor at the end of the operation by pressing the manual stop button 157, the motor will nevertheless be stopped before any damage is done, either by the automatic torque limit switch 163 (in the case of a tightening operation) or by the automatic swing-out limit switch 185 (in the case of a loosening operation).

It is seen from the foregoing disclosure that a construction is provided which admirably fulfills the above-mentioned objects of the invention. It is to be understood that the foregoing disclosure is given by way of illustrative example only, rather than by way of limitation, and that without departing from the invention, the construction may be varied within the scope of the appended claims.

What is claimed is:

1. Power wrench mechanism for turning a screw of a ceramic filter press or the like, said mechanism including a track, a carriage movable along said track to locations adjacent different filter presses, said carriage also being displaceable to a limited extent in a direction substantially perpendicular to said track, an electric motor supported from said carriage, means for coupling said electric motor to the screw to be turned, the reaction torque of said motor tending to displace said carriage in a direction substantially perpendicular to said track, and a switch mounted on said carriage in position to be operated by the displacing movement of said carriage relative to said track, for automatically stopping said motor when the reaction torque of said motor causes a predetermined displacement of said carriage relative to said track.

2. A construction as described in claim 1, further including a spring interposed between said carriage and said track in position to be deformed by displacement of said carriage relative to said track, and means for adjusting said spring to vary the reaction torque magnitude required for operating said switch to stop said motor.

3. Power wrench mechanism for turning a screw of a ceramic filter press or the like, said mechanism including a track, a carriage movable along said track to the vicinity of different filter presses, an electric motor, means for coupling said motor to the screw to be turned, supporting mechanism for supporting said motor from said carriage, said supporting mechanism being swingable relative to said carriage to carry said motor closer to or farther away from the filter press as the screw travels longitudinally, and a switch operated by the swinging movement of said supporting mechanism relative to said carriage for automatically stopping said motor when said supporting mechanism swings to a predetermined extent.

4. A construction as described in claim 3, in which said switch is mounted on said supporting mechanism and in which a bracket is mounted on said carriage in position to contact with and operate said switch upon predetermined swinging movement of said supporting mechanism relative to said carriage.

5. A construction as described in claim 3, in which said bracket carries an adjustable member for actuating said switch, so that the extent of swinging movement effective to operate said switch may be varied.

6. Power wrench mechanism for turning a screw, said mechanism including a track structure, a carriage structure supported from said track structure, a supporting linkage structure supported from said carriage structure, an electric motor supported from said linkage structure, a coupling member also supported from said linkage structure and driven by said motor for coupling said motor to the screw to be turned, said carriage structure and linkage structure both being movable relative to each other and relative to said track structure, and means responsive to predetermined movement of one of said structures relative to another of said structures for stopping the driving of said coupling member by said motor.

7. A construction as described in claim 6, in which said means is responsive to predetermined movement of said carriage structure relative to said track structure.

8. A construction as described in claim 6, in which said means is responsive to predetermined movement of said linkage structure relative to said carriage structure.

9. Apparatus including an overhead track, a carriage mounted on said track for movement along the track, a pair of links pivotally supported adjacent their upper ends from said carriage and depending downwardly therefrom, and a frame pivotally connected to and supported from said links adjacent their lower ends, said frame being adapted to support a tool for operation at various elevations and at various locations along said track by moving said carriage along said track and by swinging the lower ends of said links to vary the elevation of said frame.

10. Apparatus as described in claim 9, in which said links are mounted for swinging movement approximately in the vertical plane of said overhead track and also for swinging movement approximately in directions perpendicular to said plane.

11. Apparatus as described in claim 10, further including a lever operatively connected to one of said links near the lower end thereof and operatively connected to said carriage at a point substantially spaced from the upper end of the same one of said links, said lever being shiftable to vary the distance between the lower end of said one of said links and said point on said carriage so as to control one of said swinging movements of said links.

12. Apparatus as described in claim 11, in which said lever extends roughly horizontally, and in which the operative connection to said one of said links extends to one point on said lever and the operative connection to said carriage extends to a different point on said lever.

13. Tool supporting mechanism of the type adapted to be mounted on a carriage movable along a track, said mechanism comprising, in combination, a tool supporting member, a linkage of the parallelogram type for supporting said member from said carriage, said linkage having a plane of parallelogram movement arranged approximately vertically, adjusting means operatively connected to said parallelogram linkage approximately at two opposite corners thereof and effective to vary the distance between said two opposite corners so as to change the shape of said linkage in said plane of parallelogram movement, thereby to adjust the position of the tool supporting member in the direction of said plane, and a pivotal connection between said linkage and said carriage for swinging said linkage as a whole relatively to said carriage on a pivotal axis lying approximately horizontally and approximately in the plane of parallelogram movement of said linkage, thereby to adjust the position of said tool supporting member in a direction perpendicular to said plane.

14. A construction as described in claim 13, in which said adjusting means includes an adjusting lever, a link operatively connecting one point on said lever to said parallelogram linkage near one corner thereof, and a second link operatively connecting a different point on said lever to said parallelogram linkage near an opposite corner thereof.

15. A construction as described in claim 14, further including means for adjusting the points of connection of said links to said adjusting lever, to vary the effect produced on said parallelogram linkage by a given movement of said adjusting lever.

GROVER W. LAPP.

REFERENCES CITED

The following references are of record in the file of this patent:

UNITED STATES PATENTS

| Number | Name | Date |
|---|---|---|
| 863,074 | Lewis | Aug. 13, 1907 |
| 1,131,777 | Gage | Mar. 16, 1915 |
| 1,189,754 | Trenaman | July 4, 1916 |
| 1,478,020 | Butler | Dec. 18, 1923 |
| 1,877,595 | Royal | Sept. 13, 1932 |
| 1,970,179 | Miller | Aug. 14, 1934 |
| 2,064,814 | Andrews | Dec. 22, 1936 |
| 2,122,933 | Echman | July 5, 1938 |
| 2,179,608 | Berg et al. | Nov. 14, 1939 |
| 2,197,283 | Ward | Apr. 16, 1940 |
| 2,228,589 | Backes | Jan. 14, 1941 |